(12) United States Patent
Yun et al.

(10) Patent No.: US 10,146,084 B2
(45) Date of Patent: Dec. 4, 2018

(54) DISPLAY DEVICE

(71) Applicant: LG Display Co., Ltd., Seoul (KR)

(72) Inventors: Mi-Ra Yun, Goyang-si (KR);
Dong-Hoon Lee, Goyang-si (KR);
Jin-Yeong Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/884,551

(22) Filed: Oct. 15, 2015

(65) Prior Publication Data
US 2016/0116800 A1 Apr. 28, 2016

(30) Foreign Application Priority Data

Oct. 24, 2014 (KR) .................. 10-2014-0145068
Oct. 14, 2015 (KR) .................. 10-2015-0143618

(51) Int. Cl.
*G02F 1/1335* (2006.01)
*G02F 1/1343* (2006.01)
(Continued)

(52) U.S. Cl.
CPC ...... *G02F 1/133528* (2013.01); *G02F 1/0136* (2013.01); *G02F 1/1368* (2013.01); *G02F 1/13439* (2013.01); *G02F 1/136286* (2013.01); *G02F 1/19* (2013.01); *G02F 2001/13355* (2013.01)

(58) Field of Classification Search
CPC .......... G02F 2001/133545; G02F 2001/13629; G02F 2001/136295; G02F 1/1343; G02F 1/134363; G02F 1/133536; G02B 5/3041; G02B 5/305

See application file for complete search history.

(56) References Cited

U.S. PATENT DOCUMENTS

2004/0027524 A1* 2/2004 Shiota ............... G02F 1/133512
349/129
2004/0051827 A1* 3/2004 Hinata ............. G02F 1/133528
349/113
(Continued)

FOREIGN PATENT DOCUMENTS

CN 1469166 A 1/2004
CN 1483149 A 3/2004
WO WO 9527919 A2 10/1995

OTHER PUBLICATIONS

Office Action for Chinese Patent Application No. CN 201510688323.9, dated Mar. 5, 2018, 17 Pages.
(Continued)

*Primary Examiner* — Jessica M Merlin
(74) *Attorney, Agent, or Firm* — Fenwick & West LLP

(57) ABSTRACT

A display device includes a display panel including a plurality of pixels and outputting an image through a first surface; and a first polarizer attached to the first surface of the display panel, the first polarizer transmitting linearly-polarized light of a first direction and reflecting linearly-polarized light of a second direction perpendicular to the first direction, wherein when a voltage is not applied, the display device is used as a mirror mode and the first polarizer reflects external light, and when a voltage is applied, the display device is used as an image display mode and an image from the display panel is outputted through the first polarizer.

20 Claims, 8 Drawing Sheets

(51) Int. Cl.
*G02F 1/1368* (2006.01)
*G02F 1/1362* (2006.01)
*G02F 1/01* (2006.01)
*G02F 1/19* (2006.01)

(56) References Cited

U.S. PATENT DOCUMENTS

| | | | | |
|---|---|---|---|---|
| 2004/0051947 | A1* | 3/2004 | Kagawa | G02B 5/3025 359/489.11 |
| 2008/0143908 | A1* | 6/2008 | Bae | G02F 1/133345 349/43 |
| 2009/0079909 | A1* | 3/2009 | Ouderkirk | B29C 55/023 349/67 |
| 2010/0157195 | A1* | 6/2010 | Miyatake | G02B 5/3033 349/62 |
| 2010/0289733 | A1* | 11/2010 | Kim | G02F 1/136286 345/92 |
| 2012/0133856 | A1* | 5/2012 | Ono | G02F 1/134363 349/42 |

OTHER PUBLICATIONS

The State Intellectual Property Office of China, English Translation of Second Office Action, CN Application No. 201510688323.9, Jul. 26, 2018, 12 pages.

Zhu, Z., 《物理光学》华中科技大学出版社, Physics Optics, Jul. 31, 2009, pp. 216-218 (with concise explanation of relevance).

* cited by examiner

DISPLAY DEVICE

CROSS-REFERENCE TO RELATED APPLICATION

The present application claims priority under U.S.C. § 119(a) to Korean Patent Applications No. 10-2014-0145068 filed in the Republic of Korea on Oct. 24, 2014 and No. 10-2015-0143618 filed in the Republic of Korea on Oct. 14, 2015, which are hereby incorporated by reference in their entirety.

BACKGROUND

Field of the Disclosure

The present disclosure relates to a display device, and more particularly, to a display device having a mirror function.

Discussion of the Related Art

With rapid development of information technologies, display devices for displaying a large amount of information have been promptly developed. More particularly, flat panel display (FPD) devices having a thin profile, light weight and low power consumption such as organic electroluminescent display (OLED) devices and liquid crystal display (LCD) devices have been actively pursued and widely applied.

Recently, display devices further having a mirror function in addition to an image display function have been suggested and actively developed. That is, in on-state, the display device displays an image, and in off-state, the display device functions as a mirror.

For the mirror function, the display device includes a half mirror glass at a side where an image is displayed.

The half mirror glass has a mirror surface effect by depositing metal oxide on a surface of a glass substrate. The half mirror glass reflects some of light and transmits the other of light. By the way, since the half mirror glass has transmittance of about 40%, the half mirror glass decreases the brightness of the display device.

Particularly, when the display device is a liquid crystal display device, an upper polarizer of the liquid crystal display device has transmittance of about 43%, and the total transmittance of the upper polarizer and the half mirror glass is about 17.2%. Thus, the brightness of the liquid crystal display device including the half mirror glass is very low.

Moreover, since the half mirror glass has a thickness of about 3 mm, which is thicker than a display panel, a thickness of the display device increases due to the half mirror glass.

Furthermore, the half mirror glass is mechanically fixed to the display device, the thickness of the display device further increases. In addition, the manufacturing process is complicated, and manufacturing apparatus and materials are added to thereby increase manufacturing costs. At this time, since there exists an air gap between the half mirror glass and the display device and light is scattered, several images are generated, and image qualities are lowered.

SUMMARY

Accordingly, the present invention is directed to a display device having a mirror function that substantially obviates one or more of the problems due to limitations and disadvantages of the related art.

An object of the present disclosure is to provide a display device having a mirror function that increases brightness, a slim thickness, and improved image qualities.

Another object of the present disclosure is to provide a display device having a mirror function that is manufactured through a simple process and reduced costs.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a display device includes a display panel including a plurality of pixels and outputting an image through a first surface; and a first polarizer attached to the first surface of the display panel, the first polarizer transmitting linearly-polarized light of a first direction and reflecting linearly-polarized light of a second direction perpendicular to the first direction, wherein when a voltage is not applied, the display device is used as a mirror mode and the first polarizer reflects external light, and when a voltage is applied, the display device is used as an image display mode and an image from the display panel is outputted through the first polarizer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to the embodiments of the disclosure, examples of which are illustrated in the accompanying drawings.

First Embodiment

Figure 1:
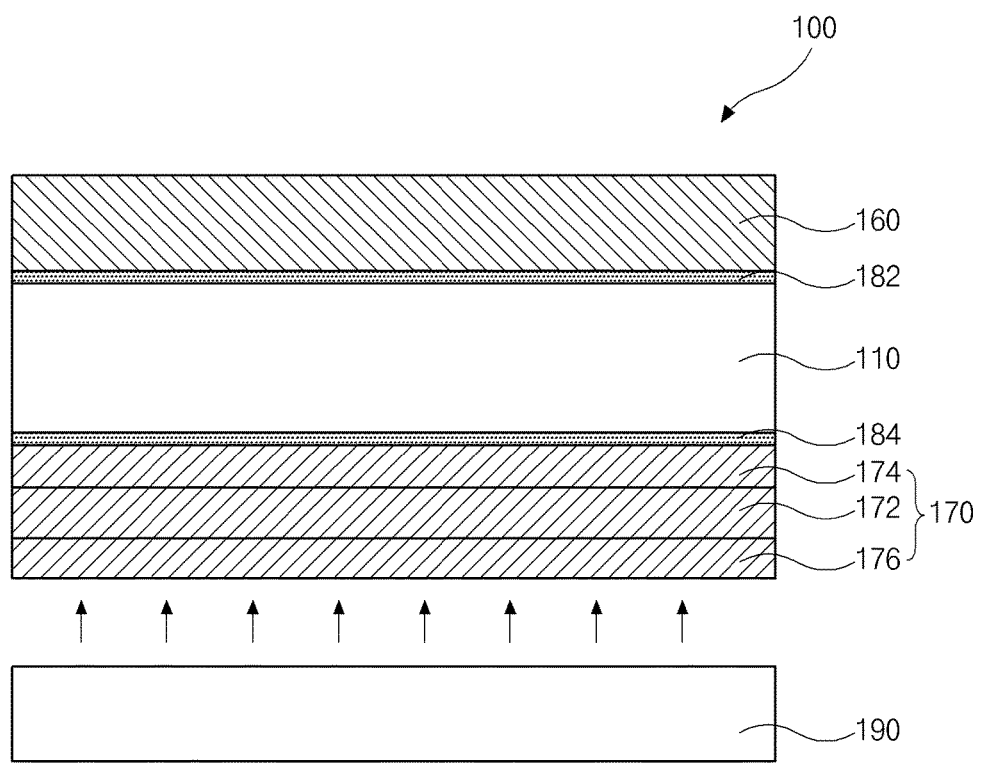
FIG. 1 is a schematic cross-sectional view of a display device according to a first embodiment of the present invention.
Figure 2:
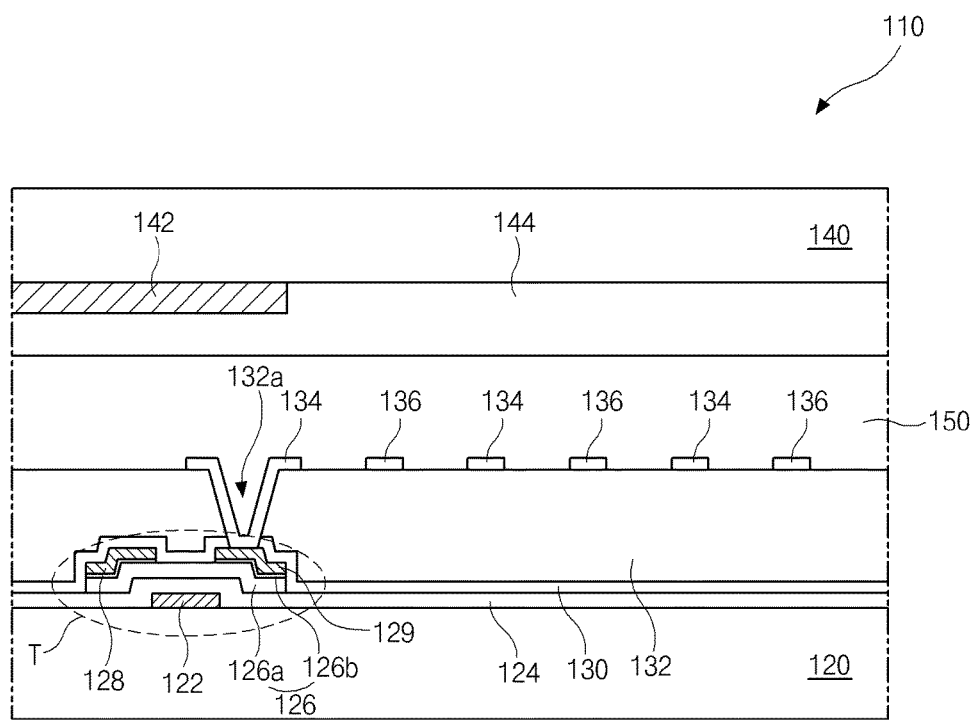
FIG. 2 is a cross-sectional view schematically illustrating a display panel of a display device according to the first embodiment of the present invention and showing a pixel region.

FIG. 1 is a schematic cross-sectional view of a display device according to a first embodiment of the present invention, and FIG. 2 is a cross-sectional view schematically illustrating a display panel of a display device according to the first embodiment of the present invention and showing a pixel region. Here, a liquid crystal panel is described as an example of the display panel.

In FIG. 1, the display device 100 according to the first embodiment of the present invention includes a liquid crystal panel 110 as a display panel, a first polarizer 160 disposed at a first side of the liquid crystal panel 110, and a second polarizer 170 disposed at a second side of the liquid crystal panel 110. In addition, the display device 100 of the present invention further includes a backlight unit 190 disposed under the second polarizer 170.

Referring to FIG. 2, the liquid crystal panel 110 includes a first substrate 120, a second substrate 140, and a liquid crystal layer 150 between the first and second substrates 120 and 140.

A gate line (not shown) and a gate electrode 122 are formed on an inner surface of the first substrate 120. The gate line extends in one direction, and the gate electrode 122 is connected to the gate line. The gate electrode 122 may extend from the gate line or may be part of the gate line.

A gate insulating layer 124 is formed on the gate line and the gate electrode 122. The gate insulating layer 124 may be formed of an inorganic insulating material such as silicon nitride (SiNx) or silicon oxide ($SiO_2$).

A semiconductor layer 126 is formed on the gate insulating layer 124 to correspond to the gate electrode 122. The semiconductor layer 126 includes an active layer 126a of intrinsic amorphous silicon and ohmic contact layers 126b of impurity-doped amorphous silicon.

Source and drain electrodes 128 and 129 are formed on the semiconductor layer 126. The source and drain electrodes 128 and 128 are spaced apart from each other over the semiconductor layer 126. The active layer 126a is exposed between the source and drain electrodes 128 and 129. The ohmic contact layers 126b may have the same shape as the source and drain electrodes 128 and 129, and the active layer 126a may have the same shape as the source and drain electrodes 128 and 129 excluding a portion of the active layer 126a between the source and drain electrodes 128 and 129. Alternatively, the source and drain electrodes 128 and 129 may partially cover sides of the active layer 126a and the ohmic contact layers 126b.

The gate electrode 122, the semiconductor layer 126, the source electrode 128, and the drain electrode 129 constitute a thin film transistor T, and the portion of the active layer 126a exposed between the source and drain electrodes 128 and 129 becomes a channel of the thin film transistor T.

Here, the thin film transistor T has an inverted staggered structure where the gate electrode 122 is disposed under the semiconductor layer 126 and the source and drain electrodes 128 and 129 are disposed over the semiconductor layer 126.

Alternatively, the thin film transistor may have a coplanar structure where the gate electrode and the source and drain electrodes are disposed at a side of the semiconductor layer, that is, over the semiconductor layer. In this case, the semiconductor layer may be formed of polycrystalline silicon, and both ends of the semiconductor layer may be doped with impurities.

Meanwhile, the semiconductor layer may be formed of oxide semiconductor, and when the thin film transistor may have an inverted staggered structure, the ohmic contact layers may be omitted.

In addition, a data line (not shown) is formed of the same material and on the same layer as the source and drain electrodes 128 and 129. The data line crosses the gate line to define a pixel region and is connected to the source electrode 128. At this time, the data line may cross the gate line with a right angle therebetween or may inclinedly cross the gate line with a predetermined angle therebetween. A dummy semiconductor pattern may be formed under the data line, and the dummy semiconductor pattern may include the same material and have the same structure as the semiconductor layer 126. Alternatively, the data line may directly contact the gate insulating layer 124 without any pattern thereunder.

A first passivation layer 130 is formed on the source and drain electrodes 128 and 129 and the data line. The first passivation layer 130 may be formed of an inorganic insulating material such as silicon oxide ($SiO_2$) or silicon nitride (SiNx).

A second passivation layer 132 is formed on the first passivation layer 130. The second passivation layer 132 has a flat surface and has a drain contact hole 132a exposing the drain electrode 129 with the first passivation layer 130. The second passivation layer 132 may be formed of an organic insulating material such as benzocyclobutene (BCB) or photo acryl.

Here, one of the first passivation layer 130 and the second passivation layer 132 may be omitted.

A pixel electrode 134 and a common electrode 136 are formed in the pixel region on the second passivation layer 132. The pixel electrode 134 is connected to the drain electrode 129 through the drain contact hole 132a. Patterns of the common electrode 136 are spaced apart from and are alternately arranged with patterns of the pixel electrode 134. The pixel electrode 134 and the common electrode 136 may be formed of a transparent conductive material such as indium tin oxide or indium zinc oxide.

Here, a common line (not shown) may be further formed of the same material and on the same layer as the gate line and may be parallel to the gate line. The second passivation layer 132 may further have a common contact hole (not shown) exposing the common line with the first passivation layer 130 and the gate insulating layer 124, and the common electrode 136 may be connected to the common line through the common contact hole.

Alternatively, the pixel electrode 134 and the common electrode 136 may overlap each other in the pixel region, and one of the pixel electrode 134 and the common electrode 136, which is disposed over the other, may have a plurality of open portions.

The first substrate 120 may be referred to as an array substrate.

In the meantime, a black matrix 142 is formed on an inner surface of the second substrate 140. The black matrix 142 has an opening corresponding to the pixel region. The black matrix 142 may be formed to correspond to the gate line, the data line, and the thin film transistor T.

A color filter layer 144 is formed over the black matrix 142 and corresponds to the opening of the black matrix 142. The color filter layer 144 includes red, green and blue color filters sequentially and repeatedly arranged such that one color filter corresponds to one pixel region.

Here, it is described that the color filter layer 144 is formed over the second substrate 140. Alternatively, the color filter layer may be formed over the first substrate 120. Namely, the liquid crystal panel 110 according to the first embodiment of the present invention may have a color filter on array structure where the color filter layer is formed over or under the thin film transistor T of the first substrate 120.

In the color filter on array structure, since an adhesion margin between the first and second substrates 120 and 140 can be decreased, an aperture ratio can be increased. At this time, the black matrix 142 may be formed over the first substrate 120 or the second substrate 140. Alternatively, the black matrix 142 may be omitted, and in this case, the aperture ratio may be further increased.

An overcoat layer (not shown) may be further formed over the color filter layer 144 to protect and flatten the color filter layer 144.

The second substrate 140 may be referred to as a color filter substrate.

Meanwhile, although not shown in the figures, a first alignment layer is formed over the pixel electrode 134 and the common electrode 136 of the first substrate 120, and a second alignment layer is formed over the color filter layer 144 of the second substrate 140. The first and second alignment layers are rubbed or photo-oriented in a predetermined direction, and surfaces of the first and second alignment layers have orientation.

The liquid crystal layer 150 is disposed between the first and second alignment layers. Liquid crystal molecules of the liquid crystal layer 150 have an initial arrangement due to the orientation direction of the first and second alignment layers.

Referring to FIG. 1 again, the first polarizer 160, as an upper polarizer, is attached to a first surface of the liquid crystal panel 110, i.e., an upper surface which an image produced by the liquid crystal panel 110 is outputted through, via a first adhesion layer 182. Namely, a surface of the first polarizer 160 adheres to the second substrate 140 of FIG. 2 of the liquid crystal panel 110 via the first adhesion layer 182. The first adhesion layer 182 may be formed of a pressure sensitive adhesive (PSA).

The first polarizer 160 is a reflective polarizer, which transmits linearly-polarized light of a first direction and reflects linearly-polarized light of a second direction perpendicular to the first direction. The first polarizer 160 is a film type and has a relatively thin thickness of dozens of micrometers. Therefore, the display device 100 can be manufactured to have a relatively slim thickness. In addition, since the first polarizer 160 has relatively high transmittance as compared with the structure of the related art including the upper polarizer and the half mirror glass, the brightness of the display device 100 can be increased. The structure of the first polarizer 160 will be described in more detail later.

In the meantime, the second polarizer 170, as a lower polarizer, is attached to a second surface of the liquid crystal panel 110, i.e., a lower surface opposite to the first surface, via a second adhesion layer 184. Namely, a surface of the second polarizer 170 adheres to the first substrate 120 of FIG. 2 of the liquid crystal panel 110 via the second adhesion layer 184. The second adhesion layer 184 may be formed of a pressure sensitive adhesive.

The second polarizer 170 is an absorptive polarizer, and an absorption axis of the second polarizer 170 is parallel to a transmission axis of the first polarizer 160. Accordingly, the second polarizer 170 absorbs linearly-polarized light of the first direction and transmits linearly-polarized light of the second direction.

The second polarizer 170 includes a polarization film 172 and first and second protection films 174 and 176. The polarization film 172 is disposed between the first and second protection films 174 and 176. The first protection film 174, the polarization film 172, and the second protection film 176 are sequentially disposed over the lower surface of the liquid crystal panel 110.

The polarization film 172 may be formed of polyvinyl alcohol (PVA), and each of the first and second protection films 174 and 176 may be formed of tri-acetyl cellulose (TAC) or cyclic olefin polymer (COP). The first and second protection films 174 and 176 may be referred to as support films.

The second polarizer 170 may be formed by stretching polyvinyl alcohol dyed with iodine ions or dichroic dyes to thereby form the polarization film 172 having an absorption axis along a stretching direction, i.e., the first direction and then attaching the first and second protection films 174 and 176 at both sides of the polarization film 172 to prevent shrinkage of the polarization film 172.

The second polarizer 170 may be provided with the second adhesion layer 184 attached to an outer surface of the first protection film 174 and with a release film, which may be referred to as a separable protection film, attached to each of the outer surfaces of the second adhesion layer 184 and the second protection film 176. The release film may be detached from the second adhesion layer 184, and the second adhesion layer 184 may be attached to the outer surface of the first substrate 120.

In addition, the backlight unit 190 is disposed under the second polarizer 170 and provides the liquid crystal panel 110 with light.

The display device 100 according to the first embodiment of the present invention is used as a mirror mode or an image display mode depending on application of a voltage. That is, when a voltage is not applied, the display device 100 has a mirror function by reflecting external light by the first polarizer 160, and when a voltage is applied, the display device 100 has an image display function by transmitting light from the backlight unit 190 through the second polarizer 170, the liquid crystal panel 110, and the first polarizer 160.

Figure 3A:
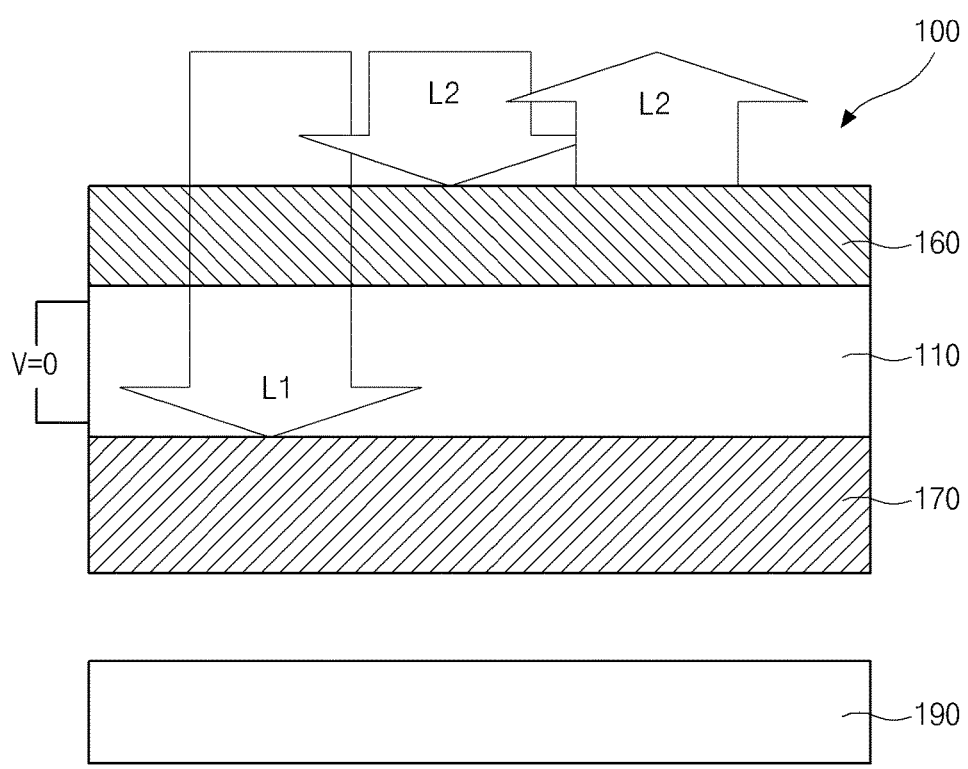
FIG. 3A and FIG. 3B are schematic cross-sectional views illustrating operation modes of a display device according to the first embodiment of the present invention.
Figure 3B:
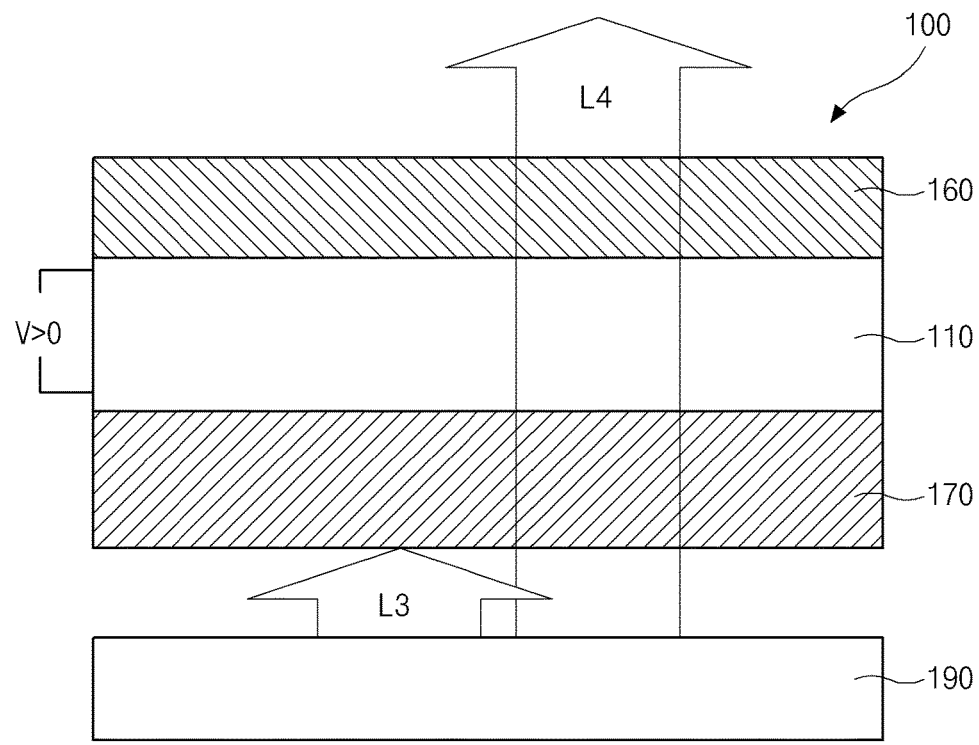

FIG. 3A and FIG. 3B are schematic cross-sectional views illustrating operation modes of a display device according to the first embodiment of the present invention. FIG. 3A shows a mirror mode, and FIG. 3B shows an image display mode.

In FIG. 3A, when the display device 100 is in off-state, i.e., a voltage is not applied to the display device 100, linearly-polarized light L1 of the first direction of external light incident on the display device 100 is transmitted by the first polarizer 160, is transmitted by the liquid crystal panel 110 as it is, and reaches the second polarizer 170. At this time, the linearly-polarized light L1 of the first direction is parallel to the absorption axis of the second polarizer 170, and the linearly-polarized light L1 of the first direction reaching the second polarizer 170 is absorbed by the second polarizer 170.

On the other hand, when the display device 100 is in off-state, linearly-polarized light L2 of the second direction of the external light, which is perpendicular to the first direction, is reflected by the first polarizer 160. Therefore, the display device 100 has a mirror function.

Meanwhile, in FIG. 3B, when the display device 100 is in on-state, i.e., a voltage is applied to the display device 100, linearly-polarized light L3 of the first direction of light from the backlight unit 190 reaches the second polarizer 170. At this time, since the linearly-polarized light L3 of the first direction is parallel to the absorption axis of the second polarizer 170, the linearly-polarized light L3 of the first direction is absorbed by the second polarizer 170.

On the other hand, when the display device 100 is in on-state, linearly-polarized light L4 of the second direction of the light from the backlight unit 190 is transmitted by the second polarizer 170, is transmitted by the liquid crystal panel 110 while changing its polarization direction, and reaches the first polarizer 160. Since the linearly-polarized light L4 reaching the first polarizer 160 is parallel to the first direction, the linearly-polarized light L4 reaching the first polarizer 160 is transmitted by first polarizer 160. Accordingly, the display device 100 displays an image.

In the related art display device, when it is in on-state, linearly-polarized light of the second direction of light from the backlight unit is transmitted by the lower polarizer, the liquid crystal panel, and the upper polarizer, and then is transmitted by the half mirror glass. Since the half mirror glass reflects some of light and transmits the other of light, part of the linearly-polarized light of the second direction transmitted by the upper polarizer is outputted to the outside.

However, in the display device 100 of the present invention, most of the linearly-polarized light L4 of the second direction transmitted by the first polarizer 160 is outputted to the outside, and thus the display device 100 of the present invention has higher brightness than the related art display device.

In the meantime, when the display device 100 is even in on-state, some of the external light is reflected by the first polarizer 160, but the light from the backlight unit 190 has higher brightness than the external light. Thus, reflection by the first polarizer 160 is not a problem.

Therefore, the display device 100 according to the first embodiment of the present invention can be used as the mirror mode or the image display mode depending on the application of a voltage.

Figure 4:
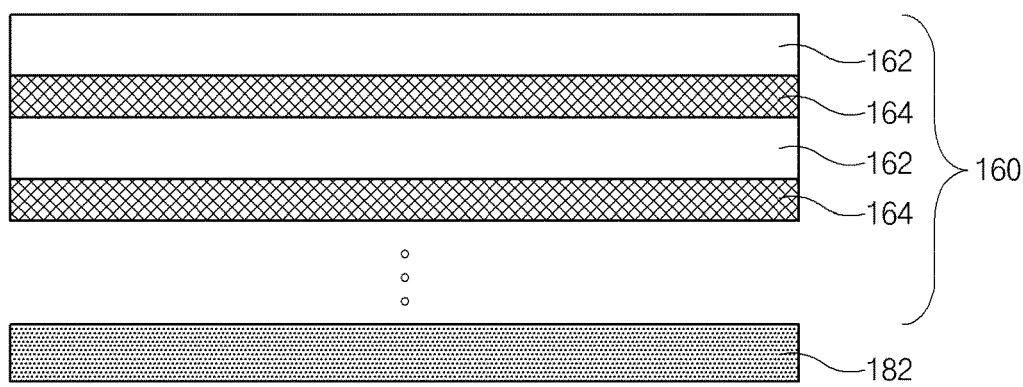
FIG. 4 is a schematic cross-sectional view of enlarging a first polarizer of a display device according to the first embodiment of the present invention.
Figure 5:
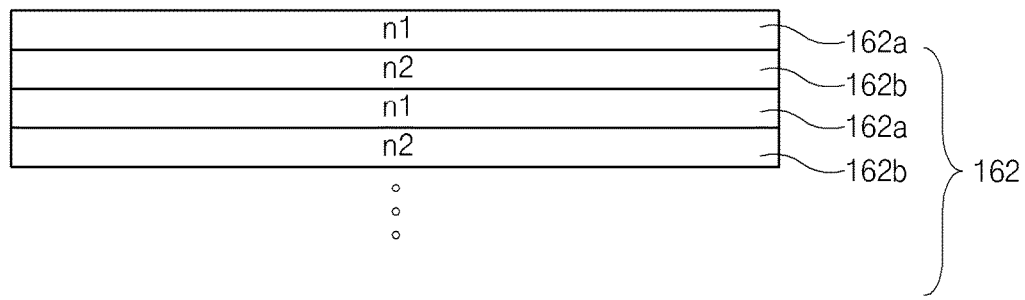
FIG. 5 is a schematic cross-sectional view of enlarging a first film of a first polarizer according to the first embodiment of the present invention.

FIG. 4 is a schematic cross-sectional view of enlarging a first polarizer of a display device according to the first embodiment of the present invention, and FIG. 5 is a schematic cross-sectional view of enlarging a first film of a first polarizer according to the first embodiment of the present invention.

In FIG. 4 and FIG. 5, the first polarizer 160 of the display device according to the first embodiment of the present invention includes first films 162 and second films 164, which are alternately layered, to increase a degree of polarization.

Each first film 162 includes first layers 162a and second layers 162b, which are alternately layered. The first layers 162a have a first refractive index n1, and the second layers 162b have a second refractive index n2. The first film 162 transmits linearly-polarized light of the first direction and reflects linearly-polarized light of the second direction perpendicular to the first direction.

In addition, each second film 164 includes dichroic dyes. The second film 164 transmits linearly-polarized light of the first direction and absorbs linearly-polarized light of the second direction. At this time, a long axis of the dichroic dyes may be parallel to the second direction. The second film 164 may include two kinds of layers having different refractive indexes, which are alternately layered.

The first adhesion layer 182 is attached to a surface of the first polarizer 160. For example, the first adhesion layer 182 may be attached to an outer surface of the second film 164 of the first polarizer. The first polarizer 160 may be provided with a release film attached to each of outer surfaces of the first adhesion layer 182 and the first film 162. The release film may be detached from the first adhesion layer 182, and the first adhesion layer 182 may be attached to the second substrate 140 of FIG. 2.

Since the first polarizer 160 can be laminated to the upper surface of the liquid crystal panel 110 of FIG. 1, the attachment process is simple, and additional apparatus and materials are not needed. Thus, manufacturing costs can be reduced. Moreover, there is no air gap between the first polarizer 160 and the liquid crystal panel 110 of FIG. 1, and image qualities can be increased.

Second Embodiment

Figure 6:
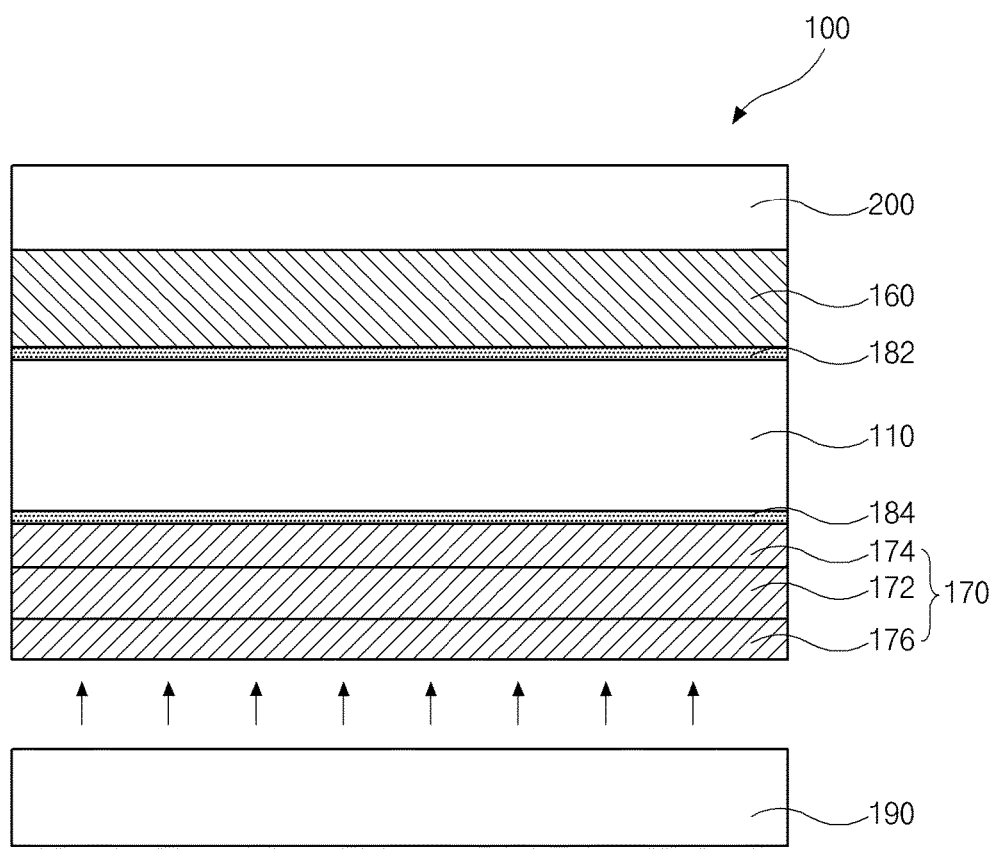
FIG. 6 is a schematic cross-sectional view of a display device according to a second embodiment of the present invention.

FIG. 6 is a schematic cross-sectional view of a display device according to a second embodiment of the present invention. The display device 100 according to the second embodiment has the same structure as the display device according to the first embodiment excluding a touch panel. Here, same parts will be designated by the same references, and explanation for the same parts will be shortened.

In FIG. 6, the display device 100 according to the second embodiment of the present invention includes a liquid crystal panel 110 as a display panel. The liquid crystal panel 110 may have the same structure as that of FIG. 2.

A first polarizer 160, as an upper polarizer, is attached to a first surface of the liquid crystal panel 110, i.e., an upper surface which an image produced by the liquid crystal panel 110 is outputted through, via a first adhesion layer 182. The first polarizer 160 is a reflective polarizer, which transmits linearly-polarized light of a first direction and reflects linearly-polarized light of a second direction perpendicular to the first direction. The first polarizer 160 may have the same structure of FIG. 4 and FIG. 5.

A touch panel 200 is disposed over the first polarizer 160. Various types of detecting location information may be applied to the touch panel 200, and for example, the touch panel 200 may be a capacitive type. The touch panel 200 of a film type may be manufactured separately and may be attached to the first polarizer 160. Alternatively, the touch panel 200 may be manufactured together by forming touch electrodes on the first polarizer 160.

In the meantime, a second polarizer 170, as a lower polarizer, is attached to a second surface of the liquid crystal panel 110, i.e., a lower surface opposite to the first surface, via a second adhesion layer 184. The second polarizer 170 is an absorptive polarizer, and an absorption axis of the second polarizer 170 is parallel to a transmission axis of the first polarizer 160. Accordingly, the second polarizer 170 absorbs linearly-polarized light of the first direction and transmits linearly-polarized light of the second direction.

Moreover, a backlight unit 190 is disposed under the second polarizer 170 of the display device 100 according to the second embodiment of the present invention.

The display device 100 according to the second embodiment of the present invention can be used as the mirror mode or the image display mode depending on the application of a voltage by using the first polarizer 160 of the reflective polarizer and can have higher transmittance and brightness than the related art display device. At this time, since the display device 100 according to the second embodiment of the present invention further includes a touch function, it can be easy to operate the display device 100.

In the embodiments, the liquid crystal panel is used as the display panel, and the display panel is not limited to this. Namely, a display panel using an organic light emitting diode or a display panel using quantum rods may be used as the display panel. At this time, the second polarizer and/or the backlight unit may be omitted.

Third Embodiment

Figure 7:
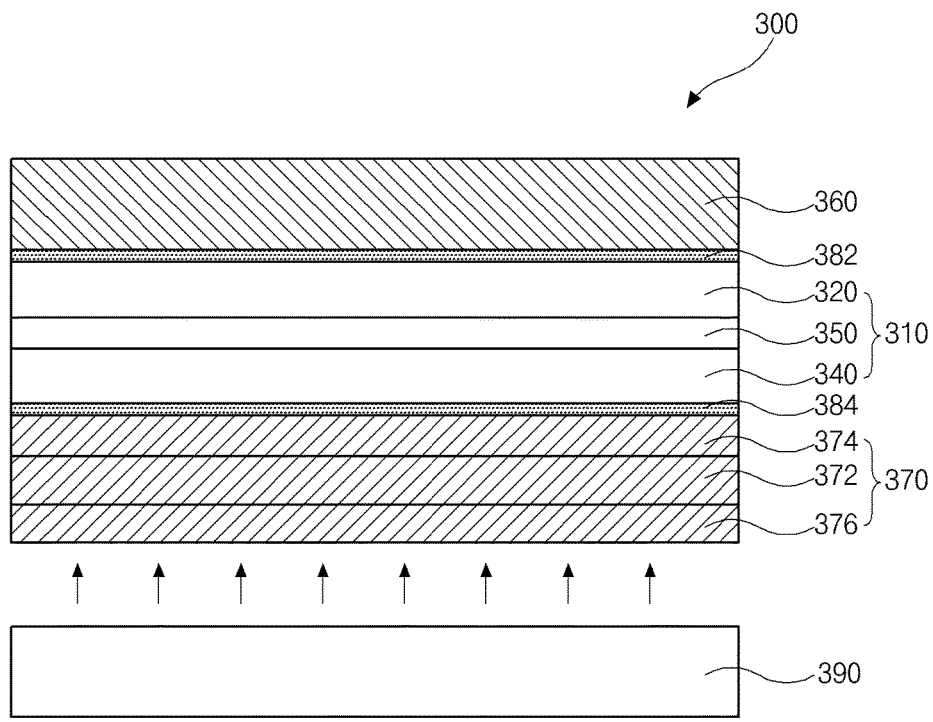
FIG. 7 is a schematic cross-sectional view of a display device according to a third embodiment of the present invention.
Figure 8:
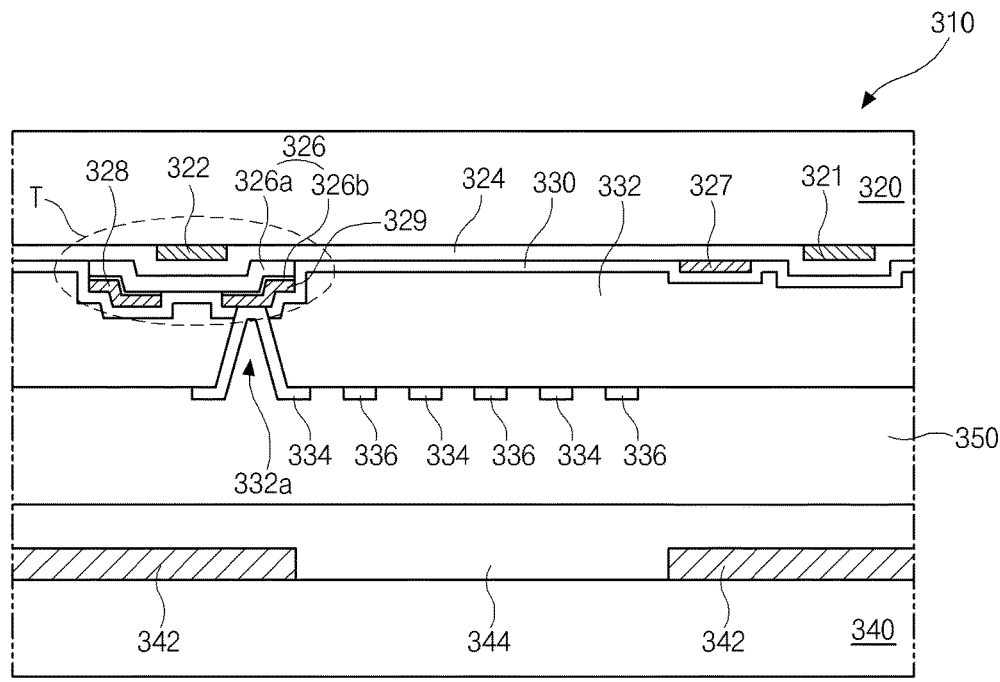
FIG. 8 is a cross-sectional view schematically illustrating a display panel of a display device according to the third embodiment of the present invention.

FIG. 7 is a schematic cross-sectional view of a display device according to a third embodiment of the present invention, and FIG. 8 is a cross-sectional view schematically illustrating a display panel of a display device according to the third embodiment of the present invention and showing a pixel region.

In FIG. 7, the display device 300 according to the third embodiment of the present invention includes a liquid crystal panel 310 as a display panel, and the liquid crystal panel 310 includes a first substrate 320, a second substrate 340, and a liquid crystal layer 350 between the first and second substrates 320 and 340. An image produced by the liquid crystal panel 310 is outputted to the outside through the first substrate 320.

In addition, the display device 300 of the present invention further includes a first polarizer 360 disposed at a first side of the liquid crystal panel 310, i.e., at an outer surface of the first substrate 320, a second polarizer 370 disposed at a second side of the liquid crystal panel 310, i.e., at an outer surface of the second substrate 340, and a backlight unit 390 disposed under the second polarizer 370.

Referring to FIG. 8, a gate line 321 and a gate electrode 322 are formed on an inner surface of the first substrate 320 of the liquid crystal panel 310. The gate line 321 and the gate electrode 322 are formed of a metallic material having relatively low resistivity, which may be copper (Cu), for example. The gate line 321 extends in one direction, and the gate electrode 322 is connected to the gate line 321. The gate electrode 322 may extend from the gate line 321 or may be part of the gate line 321.

A gate insulating layer 324 is formed on the gate line 321 and the gate electrode 322. The gate insulating layer 324 may be formed of an inorganic insulating material such as silicon nitride (SiNx) or silicon oxide (SiO$_2$).

A semiconductor layer 326 is formed on the gate insulating layer 324 to correspond to the gate electrode 322. The semiconductor layer 326 includes an active layer 326a of intrinsic amorphous silicon and ohmic contact layers 326b of impurity-doped amorphous silicon.

Source and drain electrodes 328 and 329 are formed on the semiconductor layer 326. The source and drain electrodes 328 and 328 are spaced apart from each other over the semiconductor layer 326. The active layer 326a is exposed between the source and drain electrodes 328 and 329. The ohmic contact layers 326b may have the same shape as the source and drain electrodes 328 and 329, and the active layer 326a may have the same shape as the source and drain electrodes 328 and 329 excluding a portion of the active layer 326a between the source and drain electrodes 328 and 329. Alternatively, the source and drain electrodes 328 and 329 may partially cover sides of the active layer 326a and the ohmic contact layers 326b.

The gate electrode 322, the semiconductor layer 326, the source electrode 328, and the drain electrode 329 constitute a thin film transistor T, and the portion of the active layer 326a exposed between the source and drain electrodes 328 and 329 becomes a channel of the thin film transistor T.

Here, the thin film transistor T has an inverted staggered structure where the gate electrode 322 is disposed substantially under the semiconductor layer 326 and the source and drain electrodes 328 and 329 are disposed substantially over the semiconductor layer 326.

Alternatively, the thin film transistor may have a coplanar structure where the gate electrode and the source and drain electrodes are disposed at a side of the semiconductor layer, that is, substantially over the semiconductor layer. In this case, the semiconductor layer may be formed of polycrystalline silicon, and both ends of the semiconductor layer may be doped with impurities.

Meanwhile, the semiconductor layer may be formed of oxide semiconductor, and when the thin film transistor may have an inverted staggered structure, the ohmic contact layers may be omitted.

In addition, a data line 327 is formed of the same material and on the same layer as the source and drain electrodes 328 and 329. The data line 327 and the source and drain electrodes 328 and 329 are formed of a metallic material having relatively low resistivity, which may be copper (Cu), for example. Although not shown in the figure, the data line 327 crosses the gate line 321 to define a pixel region and is connected to the source electrode 328. At this time, the data line 327 may cross the gate line 321 with a right angle therebetween or may inclinedly cross the gate line 321 with a predetermined angle therebetween. The data line 327 is in direct contact with the gate insulating layer 324. Alternatively, a dummy semiconductor pattern may be formed under the data line, that is, between the gate insulating layer 324 and the data line 327, and the dummy semiconductor pattern may include the same material and have the same structure as the semiconductor layer 326.

A first passivation layer 330 is formed on the source and drain electrodes 328 and 329 and the data line 327. The first passivation layer 330 may be formed of an inorganic insulating material such as silicon oxide (SiO$_2$) or silicon nitride (SiNx).

A second passivation layer 332 is formed on the first passivation layer 330. The second passivation layer 332 has a flat surface and has a drain contact hole 332a exposing the drain electrode 329 with the first passivation layer 330. The second passivation layer 332 may be formed of an organic insulating material such as benzocyclobutene (BCB) or photo acryl.

Here, one of the first passivation layer 330 and the second passivation layer 332 may be omitted.

A pixel electrode 334 and a common electrode 336 are formed in the pixel region on the second passivation layer 332. The pixel electrode 334 is connected to the drain electrode 329 through the drain contact hole 332a. Patterns of the common electrode 336 are spaced apart from and are alternately arranged with patterns of the pixel electrode 334. The pixel electrode 334 and the common electrode 336 may be formed of a transparent conductive material such as indium tin oxide or indium zinc oxide.

Here, a common line (not shown) may be further formed of the same material and on the same layer as the gate line 321 and may be parallel to the gate line 321. The second passivation layer 332 may further have a common contact hole (not shown) exposing the common line with the first passivation layer 330 and the gate insulating layer 324, and the common electrode 336 may be connected to the common line through the common contact hole.

Alternatively, the pixel electrode 334 and the common electrode 336 may overlap each other in the pixel region, and one of the pixel electrode 334 and the common electrode 336, which is disposed over the other, may have a plurality of open portions.

The first substrate 320 may be referred to as an array substrate.

In the meantime, a black matrix 342 is formed on an inner surface of the second substrate 340. The black matrix 342 has an opening corresponding to the pixel region. The black matrix 342 may be formed to correspond to the gate line 321, the data line 327, and the thin film transistor T.

A color filter layer 344 is formed over the black matrix 342 and corresponds to the opening of the black matrix 342. The color filter layer 344 includes red, green and blue color filters sequentially and repeatedly arranged such that one color filter corresponds to one pixel region.

Here, it is described that the color filter layer 344 is formed over the second substrate 340. Alternatively, the color filter layer may be formed over the first substrate 320. Namely, the liquid crystal panel 310 according to the third embodiment of the present invention may have a color filter on array structure where the color filter layer is formed over or under the thin film transistor T of the first substrate 320.

In the color filter on array structure, since an adhesion margin between the first and second substrates 320 and 340 can be decreased, an aperture ratio can be increased. At this time, the black matrix 342 may be formed over the first substrate 320 or the second substrate 340. Alternatively, the black matrix 342 may be omitted, and in this case, the aperture ratio may be further increased.

An overcoat layer (not shown) may be further formed over the color filter layer 344 to protect and flatten the color filter layer 344.

The second substrate 340 may be referred to as a color filter substrate.

Meanwhile, although not shown in the figures, a first alignment layer is formed over the pixel electrode 334 and the common electrode 336 of the first substrate 320, and a second alignment layer is formed over the color filter layer 344 of the second substrate 340. The first and second alignment layers are rubbed or photo-oriented in a predetermined direction, and surfaces of the first and second alignment layers have orientation.

The liquid crystal layer 350 is disposed between the first and second alignment layers. Liquid crystal molecules of the liquid crystal layer 350 have an initial arrangement due to the orientation direction of the first and second alignment layers.

Referring to FIG. 7 again, the first polarizer 360, as an upper polarizer, is attached to a first surface of the liquid crystal panel 310, i.e., an upper surface which an image produced by the liquid crystal panel 310 is outputted through, via a first adhesion layer 382. Namely, a surface of the first polarizer 360 adheres to the first substrate 320 of FIG. 8 of the liquid crystal panel 310 via the first adhesion layer 382. The first adhesion layer 382 may be formed of a pressure sensitive adhesive (PSA).

The first polarizer 360 is a reflective polarizer, which transmits linearly-polarized light of a first direction and reflects linearly-polarized light of a second direction perpendicular to the first direction. The first polarizer 360 is a film type and has a relatively thin thickness of dozens of micrometers. Therefore, the display device 300 can be manufactured to have a relatively slim thickness. In addition, since the first polarizer 360 has relatively high transmittance as compared with the structure of the related art including the upper polarizer and the half mirror glass, the brightness of the display device 300 can be increased. The first polarizer 360 may have the structure shown in FIG. 4 and FIG. 5.

Namely, the first polarizer 360 includes first films 162 of FIG. 4 and second films 164 of FIG. 4, which are alternately layered. Each first film 162 of FIG. 4 includes first layers 162a of FIG. 5 and second layers 162b of FIG. 5, which are alternately layered. The first layers 162a of FIG. 5 have a first refractive index n1, and the second layers 162b have a second refractive index n2. The first film 162 of FIG. 4 transmits linearly-polarized light of the first direction and reflects linearly-polarized light of the second direction perpendicular to the first direction.

In addition, each second film 164 of FIG. 4 includes dichroic dyes. The second film 164 of FIG. 4 transmits linearly-polarized light of the first direction and absorbs linearly-polarized light of the second direction. At this time, a long axis of the dichroic dyes may be parallel to the second direction. The second film 164 of FIG. 4 may include two kinds of layers having different refractive indexes, which are alternately layered.

In the meantime, the second polarizer 370, as a lower polarizer, is attached to a second surface of the liquid crystal panel 310, i.e., a lower surface opposite to the first surface, via a second adhesion layer 384. Namely, a surface of the second polarizer 370 adheres to the second substrate 340 of FIG. 8 of the liquid crystal panel 310 via the second adhesion layer 384. The second adhesion layer 384 may be formed of a pressure sensitive adhesive.

The second polarizer 370 is an absorptive polarizer, and an absorption axis of the second polarizer 370 is parallel to a transmission axis of the first polarizer 360. Accordingly, the second polarizer 370 absorbs linearly-polarized light of the first direction and transmits linearly-polarized light of the second direction.

The second polarizer 370 includes a polarization film 372 and first and second protection films 374 and 376. The polarization film 372 is disposed between the first and second protection films 374 and 376. The first protection film 374, the polarization film 372, and the second protection film 376 are sequentially disposed over the lower surface of the liquid crystal panel 310.

The polarization film 372 may be formed of polyvinyl alcohol (PVA), and each of the first and second protection films 374 and 376 may be formed of tri-acetyl cellulose (TAC) or cyclic olefin polymer (COP). The first and second protection films 374 and 376 may be referred to as support films.

The second polarizer 370 may be formed by stretching polyvinyl alcohol dyed with iodine ions or dichroic dyes to thereby form the polarization film 372 having an absorption axis along a stretching direction, i.e., the first direction and then attaching the first and second protection films 374 and 376 at both sides of the polarization film 372 to prevent shrinkage of the polarization film 372.

In addition, the backlight unit 390 is disposed under the second polarizer 370 and provides the liquid crystal panel 310 with light.

The display device 300 according to the third embodiment of the present invention is used as a mirror mode or an image display mode depending on application of a voltage. That is, when a voltage is not applied, the display device 300 has a mirror function by reflecting external light by the first polarizer 360, and when a voltage is applied, the display device 300 has an image display function by transmitting light from the backlight unit 390 through the second polarizer 370, the liquid crystal panel 310, and the first polarizer 360.

Figure 9A:
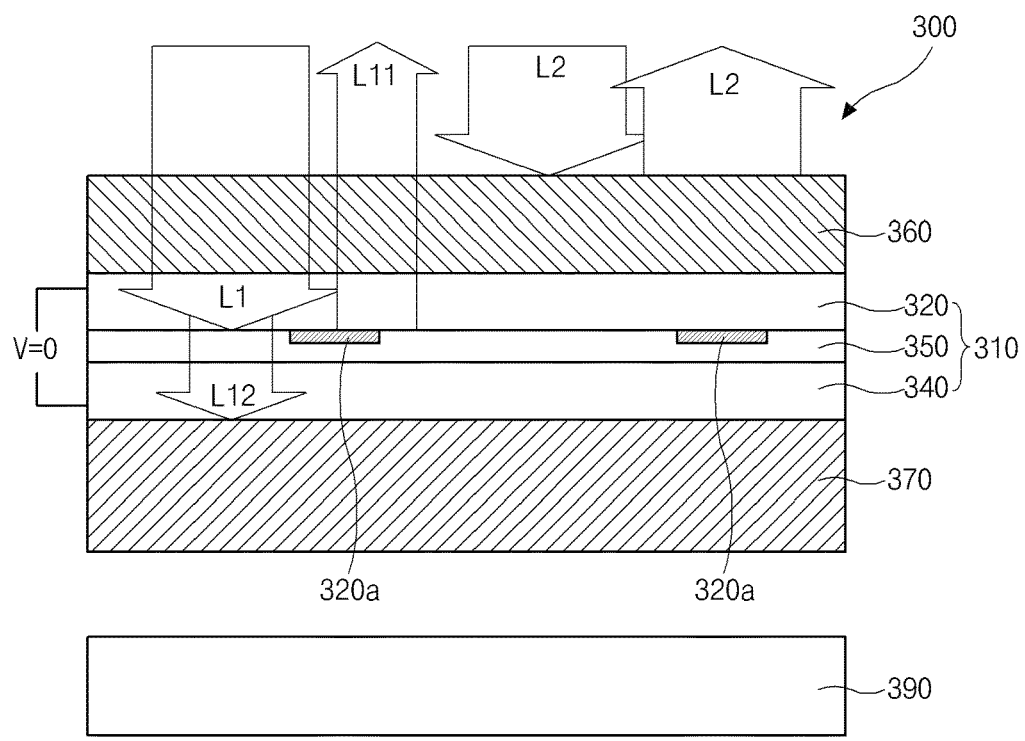
FIG. 9A and FIG. 9B are schematic cross-sectional views illustrating operation modes of a display device according to the third embodiment of the present invention.
Figure 9B:
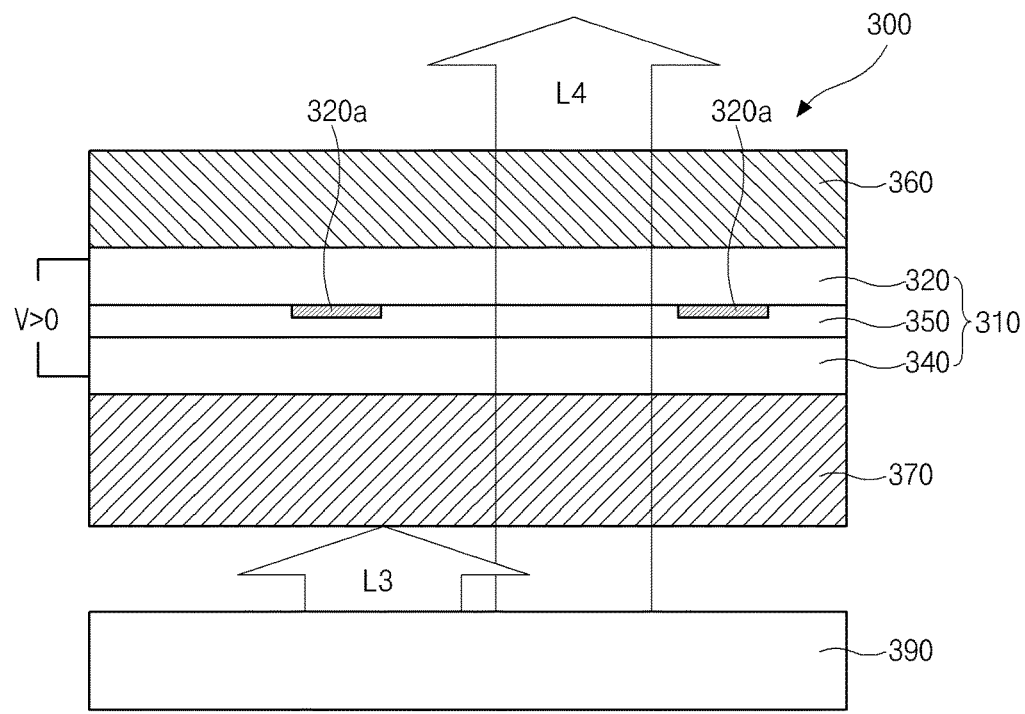

FIG. 9A and FIG. 9B are schematic cross-sectional views illustrating operation modes of a display device according to the third embodiment of the present invention. FIG. 9A shows a mirror mode, and FIG. 9B shows an image display mode.

In FIG. 9A, when the display device 300 is in off-state, i.e., a voltage is not applied to the display device 300, linearly-polarized light L1 of the first direction of external light incident on the display device 300 is transmitted by the first polarizer 360. Some L11 of the linearly-polarized light L1 of the first direction transmitted by the first polarizer 360 is reflected by a metal layer 320a, which is formed on an inner surface of the first substrate 320 of the liquid crystal panel 310, is transmitted by the first polarizer 360 again, and is outputted to the outside. Here, the metal layer 320a may be at least one of the gate line 321 and the data line 317 of FIG. 8.

Moreover, the other L12 of the linearly-polarized light L1 of the first direction transmitted by the first polarizer 360 is transmitted by the first substrate 320, the liquid crystal layer 350 and the second substrate 340 of the liquid crystal panel 310 as it is, and reaches the second polarizer 370. At this time, the other L12 of the linearly-polarized light L1 of the first direction is parallel to the absorption axis of the second polarizer 370, and the other L12 of the linearly-polarized light L1 of the first direction reaching the second polarizer 370 is absorbed by the second polarizer 370.

On the other hand, when the display device 300 is in off-state, linearly-polarized light L2 of the second direction of the external light, which is perpendicular to the first direction, is reflected by the first polarizer 360.

Therefore, the display device 300 has a mirror function due to the linearly-polarized light L11 of the first direction, which is outputted to the outside, and the linearly-polarized light L2 of the second direction, which is reflected.

Meanwhile, in FIG. 9B, when the display device 300 is in on-state, i.e., a voltage is applied to the display device 300, linearly-polarized light L3 of the first direction of light from the backlight unit 390 reaches the second polarizer 370. At this time, since the linearly-polarized light L3 of the first direction is parallel to the absorption axis of the second polarizer 370, the linearly-polarized light L3 of the first direction is absorbed by the second polarizer 370.

On the other hand, when the display device 300 is in on-state, linearly-polarized light L4 of the second direction of the light from the backlight unit 390 is transmitted by the second polarizer 370, is transmitted by the liquid crystal layer 350 of the liquid crystal panel 310 while changing its polarization direction, and reaches the first polarizer 360. Since the linearly-polarized light L4 reaching the first polarizer 360 is parallel to the first direction, the linearly-polarized light L4 reaching the first polarizer 360 is transmitted by first polarizer 360. Accordingly, the display device 300 displays an image.

Therefore, the display device 300 according to the third embodiment of the present invention can be used as the mirror mode or the image display mode depending on the application of a voltage.

The display device 300 according to the third embodiment of the present invention has higher reflectance than the display device 100 of FIG. 3A according to the first embodiment due to the linearly-polarized light L11 of the first direction, which is reflected by the metal layer 320a of the first substrate 320 of the liquid crystal panel 310 and is outputted. Thus, the display device 300 according to the third embodiment of the present invention can provide more superior mirror function than the first embodiment.

The reflectance depends on an occupation area of the metal layer 320a in the display device 300 and the reflectance of the metal layer 320a. Under the same conditions, while the display device 100 of FIG. 3A according to the first embodiment has the reflectance of about 64%, the display device 300 according to the third embodiment has the reflectance of about 68%.

Meanwhile, in the display device 300 according to the third embodiment of the present invention, the gate line 321 of FIG. 8 and the data line 327 of FIG. 8, which are used as the metal layer 320a, are formed of copper. Alternatively, at least one of the gate line 321 of FIG. 8 and the data line 327 of FIG. 8 may be formed of a metallic material having higher reflectance than copper, and the reflectance of the display device 300 in the mirror mode may be further increased.

At this time, since a total area of the gate line 321 of FIG. 8 is larger than a total area of the data line 327 of FIG. 8, it is beneficial that the gate line 321 of FIG. 8 or the gate and data lines 321 and 327 of FIG. 8 may be formed of the metallic material having the higher reflectance than copper.

For example, the gate line 321 of FIG. 8 and/or the data line 327 of FIG. 8 may be formed of aluminum (Al) or silver-paladium-copper (Ag—Pd—Cu: APC) alloy, and aluminum (Al) or silver-paladium-copper (Ag—Pd—Cu: APC) alloy has the reflectance of about 95%.

Fourth Embodiment

Figure 10:
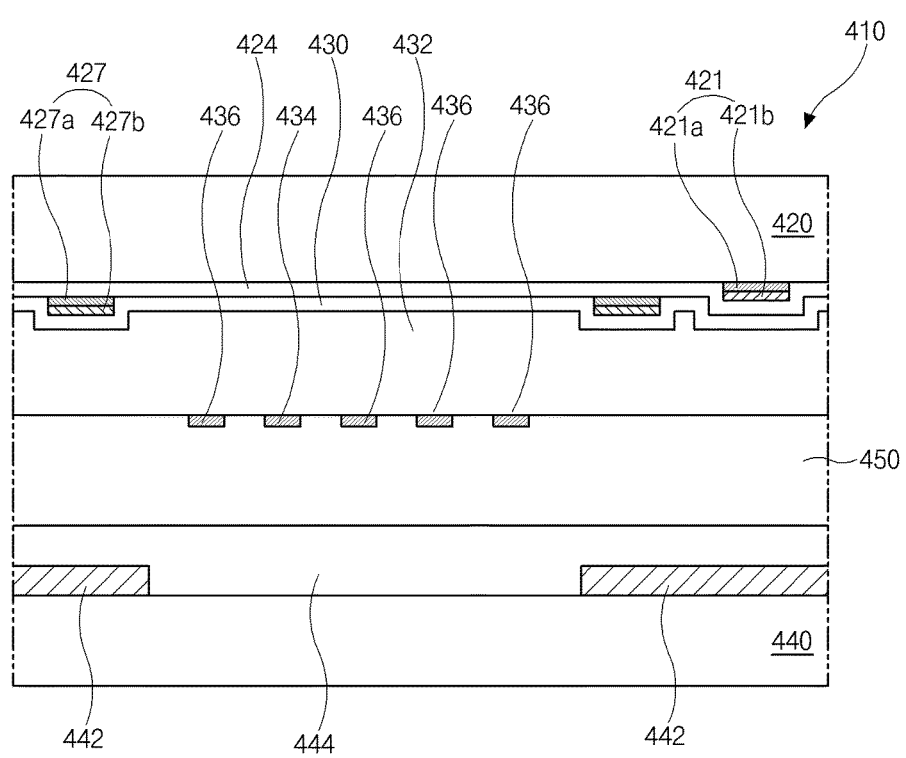
FIG. 10 is a schematic cross-sectional view schematically illustrating a display panel of a display device according to a fourth embodiment of the present invention.

FIG. 10 is a schematic cross-sectional view schematically illustrating a display panel of a display device according to a fourth embodiment of the present invention.

In FIG. 10, the display panel 410 of the display device according to the fourth embodiment of the present invention is a liquid crystal panel and includes a first substrate 420, a second substrate 440, and a liquid crystal layer 450 between the first and second substrates 420 and 440. An image produced by the liquid crystal panel 410 is outputted to the outside through the first substrate 420.

A gate line 421 is formed on an inner surface of the first substrate 420. The gate line 421 has a double-layered structure including a first gate layer 421a and a second gate layer 421b. The first gate layer 421a is formed of a metallic material having relatively high reflectance, and the second gate layer 421b is formed of a metallic material having relatively low resistivity. Namely, the reflectance of the first gate layer 421a is higher than the reflectance of the second gate layer 421b, and the resistivity of the second gate layer 421b is lower than the resistivity of the first gate layer 421a. For example, the first gate layer 421a is formed of aluminum (Al) or silver-paladium-copper (Ag—Pd—Cu: APC) alloy, and the second gate layer 421b is formed of copper (Cu).

A gate insulating layer 424 is formed on the gate line 421 substantially all over the first substrate 420.

A data line 427 is formed on the gate insulating layer 424 and crosses the gate line 421. The data line 427 has a double-layered structure including a first data layer 427a and a second data layer 427b. The first data layer 427a is formed of a metallic material having relatively high reflectance, and the second data layer 427b is formed of a metallic material having relatively low resistivity. Namely, the reflectance of the first data layer 427a is higher than the reflectance of the second data layer 427b, and the resistivity of the second data layer 427b is lower than the resistivity of the first data layer 427a. For example, the first data layer 427a is formed of aluminum (Al) or silver-paladium-copper (Ag—Pd—Cu: APC) alloy, and the second data layer 427b is formed of copper (Cu).

In the meantime, although not shown in the figure, a thin film transistor is formed on the inner surface of the first substrate 410, and the thin film transistor includes a gate electrode, a semiconductor layer, a source electrode, and a drain electrode. The gate electrode may be formed of the same material on the same layer as the gate line 421, and the source and drain electrodes may be formed of the same material on the same layer as the data line 427. The semiconductor layer may be disposed between the gate electrode and the source and drain electrodes.

A first passivation layer 430 and a second passivation layer 432 are sequentially formed on the data line 427 and the thin film transistor substantially all over the first substrate 420.

A pixel electrode 434 and a common electrode 436 are formed on the second passivation layer 432. Patterns of the common electrode 436 are spaced apart from and are alternately arranged with patterns of the pixel electrode 434. The pixel electrode 434 and the common electrode 436 include a metallic material having relatively high reflectance. For example, the pixel electrode 434 and the common electrode 436 may include aluminum (Al) or silver-paladium-copper (Ag—Pd—Cu: APC) alloy. Here, the pixel electrode 434 and the common electrode 436 may have a single-layered structure including aluminum (Al) or silver-paladium-copper (Ag—Pd—Cu: APC) alloy.

Alternatively, the pixel electrode 434 and the common electrode 436 may have a double-layered structure including a first electrode layer and a second electrode layer. At this time, the first electrode layer may be formed of aluminum (Al) or silver-paladium-copper (Ag—Pd—Cu: APC) alloy, and the second electrode layer may be formed of a transparent conductive material such as indium tin oxide or indium zinc oxide.

Particularly, when the pixel electrode 434 and the common electrode 436 include aluminum (Al) or silver-paladium-copper (Ag—Pd—Cu: APC) alloy, it is desirable that the pixel electrode 434 and the common electrode 436 have a double-layered structure to prevent oxidation of silver-paladium-copper (Ag—Pd—Cu: APC) alloy.

Meanwhile, a black matrix 442 is formed on an inner surface of the second substrate 440, and a color filter layer 444 is formed on the black matrix 442. The color filter layer 444 and/or the black matrix 442 may be formed on the first substrate 420.

A liquid crystal layer 450 is disposed between the pixel and common electrodes 434 and 436 of the first substrate 420 and the color filter layer 444 of the second substrate 440.

In the display device according to the fourth embodiment of the present invention including the display panel 410, a first polarizer (not shown) of a reflective polarizer is attached to an outer surface of the first substrate 420 of the display panel 410, and a second polarizer (not shown) of an absorptive polarizer is attached to an outer surface of the second substrate 440 of the display panel 410. The first polarizer may have the structure shown in FIG. 4 and FIG. 5.

Accordingly, the display device according to the fourth embodiment of the present invention is used as a mirror mode or an image display mode depending on application of a voltage.

At this time, in the display device according to the fourth embodiment of the present invention, the pixel electrode 434 and the common electrode 436 also include the metallic material having the relatively high reflectance in addition to the gate line 421 and the data line 427. Therefore, the reflectance of the display device according to the fourth embodiment in the mirror mode is further increased as compared with the display device 300 of FIG. 9A according to the third embodiment.

Under the same conditions, while the display device 300 of FIG. 9A according to the third embodiment has the reflectance of about 68%, the display device according to the fourth embodiment has the reflectance of about 72%.

Moreover, in the display device according to the fourth embodiment, since the gate line 421 and the data line 427 further include a metallic material having relatively low resistivity, the reflectance in the mirror mode is further increased as compared with the display device 300 of FIG. 9A according to the third embodiment. Furthermore, a decrease in an image quality due to signal delays is prevented.

In the present invention, the display device has the mirror function due to a reflective polarizer, and the brightness of the display device can be increased.

The reflective polarizer is a film type and has a relatively thin thickness of dozens of micrometers. Therefore, the display device can be manufactured to have a relatively slim thickness. In addition, since the reflective polarizer can be laminated to the upper surface of the display panel, the attachment process is simple, and additional apparatus and materials are not needed. Thus, manufacturing costs can be reduced.

Moreover, there is no air gap between the reflective polarizer and the display panel, and light is prevented from being scattered to thereby increase the image qualities.

Meanwhile, the reflective polarizer is attached to the array substrate including signal lines, and the reflectance of the display device increases owing to light reflected by the signal lines. Thus, it is possible to provide more superior mirror function.

At this time, the signal lines are formed of a metallic material having relatively high reflectance, and the reflectance of the display device is further increased. In addition, the signal lines further include a metallic material having relatively low resistivity, and a decrease in an image quality due to signal delays is prevented.

It will be apparent to those skilled in the art that various modifications and variations can be made in a display device of the present disclosure without departing from the sprit or scope of the invention. Thus, it is intended that the present invention covers the modifications and variations of this invention provided they come within the scope of the appended claims and their equivalents.

What is claimed is:
1. A display device comprising:
   a display panel including:
      a first substrate;
      a plurality of gate lines and a plurality of data lines on the first substrate, at least one gate line or data line including a first metal layer and a second metal layer that is under the first metal layer, and wherein the first metal layer has a reflectance that is higher than a reflectance of the second metal layer, and wherein a resistivity of the second metal layer is lower than a resistivity of the first metal layer; and
      a plurality of pixels at intersections of the plurality of gate lines and the plurality of data lines, the plurality of pixels outputting an image through a first surface of the display panel; and a first polarizer attached to the first surface of the display panel and closer to the first metal layer than the second metal layer, the first polarizer transmitting linearly-polarized light of a first direction and reflecting linearly-polarized light of a second direction perpendicular to the first direction, wherein the display device is configured to operate in a mirror mode wherein a voltage is not applied to electrodes of the display panel by a driver and the first polarizer reflects external light, and the display device configured to operate in an image display mode wherein a voltage is applied to the electrodes of the display panel by the driver and an image from the display panel is outputted through the first polarizer.

2. The display device of claim 1, wherein the first polarizer includes at least one first film and at least one second film, and wherein the at least one first film transmits the linearly-polarized light of the first direction and reflects the linearly-polarized light of the second direction, and the at least one second film transmits the linearly-polarized light of the first direction and absorbs the linearly-polarized light of the second direction.

3. The display device of claim 2, wherein the first polarizer includes a plurality of first films and a plurality of second films, which are alternately layered.

4. The display device of claim 2, wherein the at least one first film includes first layers and second layers, which are alternately layered, and wherein each of the first layers has a first refractive index, and each of the second layers has a second refractive index different from the first refractive index.

5. The display device of claim 2, wherein the at least one second film includes dichroic dyes, and a long axis of the dichroic dyes is parallel to the second direction.

6. The display device of claim 1, further comprising:

a second polarizer attached to a second surface of the display panel, the second polarizer absorbing the linearly-polarized light of the first direction and transmitting the linearly-polarized light of the second direction; and a backlight unit disposed at an outer surface of the second polarizer wherein the display panel further includes a second substrate and a liquid crystal layer between the first and second substrates.

7. The display device of claim 6, wherein the first substrate includes a thin film transistor, a pixel electrode and a common electrode, and the first polarizer is attached to the first substrate.

8. The display device of claim 1, wherein at least one gate line or data line includes aluminum or silver-palladium-copper alloy.

9. The display device of claim 1, wherein the first metal layer includes aluminum or silver-palladium-copper alloy, and the second metal layer includes copper.

10. The display device of claim 7, wherein the pixel electrode and the common electrode include a first electrode layer of aluminum or silver-palladium-copper alloy.

11. The display device of claim 10, wherein the pixel electrode and the common electrode further include a second electrode layer of indium tin oxide or indium zinc oxide.

12. The display device of claim 1, wherein the second metal layer is on the first metal layer.

13. A display device comprising:

a display panel including a plurality of pixels and outputting an image through a first surface; and a first polarizer attached to the first surface of the display panel, the first polarizer transmitting linearly-polarized light of a first direction and reflecting linearly-polarized light of a second direction perpendicular to the first direction, wherein the display device is configured to operate in a mirror mode wherein a voltage is not applied to electrodes of the display panel by a driver and the first polarizer reflects external light, and the display device is configured to operate in an image display mode wherein a voltage is applied to the electrodes of the display panel by the driver and an image from the display panel is outputted through the first polarizer, wherein the first polarizer includes a plurality of first films and a plurality of second films, which are alternately layered, and wherein each of the plurality of first films includes first layers and second layers, which are alternately layered such that at least one of the second layers is in direct contact with two of the first layers.

14. The display device of claim 13, wherein the plurality of first films transmits the linearly-polarized light of the first direction and reflects the linearly-polarized light of the second direction, and the plurality of second films transmits the linearly-polarized light of the first direction and absorbs the linearly-polarized light of the second direction.

15. The display device of claim 14, wherein each of the first layers has a first refractive index, and each of the second layers has a second refractive index different from the first refractive index.

16. The display device of claim 14, wherein the plurality of second films includes dichroic dyes, and a long axis of the dichroic dyes is parallel to the second direction.

17. The display device of claim 13, wherein the display panel includes:

a first substrate;

a plurality of gate lines and a plurality of data lines on the first substrate, at least one gate line or data line including a first metal layer and a second metal layer, and wherein the first metal layer has a reflectance that is higher than a reflectance of the second metal layer, and wherein a resistivity of the second metal layer is lower than a resistivity of the first metal layer; and a plurality of pixels at intersections of the plurality of gate lines and the plurality of date lines, the plurality of pixels outputting an image through a first surface of the display panel.

18. The display device of claim 17, wherein the first polarizer is attached to the first substrate.

19. The display device of claim 17, wherein the first metal layer is disposed between the first substrate and the second metal layer.

20. The display device of claim 13, further comprising a touch panel over the first polarizer.

* * * * *